United States Patent
Dong et al.

(10) Patent No.: US 10,100,945 B2
(45) Date of Patent: Oct. 16, 2018

(54) SOLENOID VALVE AND SOLENOID VALVE DEVICE

(71) Applicant: XIAMEN KOGE MICRO TECH CO., LTD., Xiamen (CN)

(72) Inventors: Zhenkai Dong, New Taipei (TW); Xueqin Huang, Xiamen (CN)

(73) Assignee: XIAMEN KOGE MICRO TECH CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/098,209

(22) Filed: Apr. 13, 2016

(65) Prior Publication Data

US 2016/0356393 A1 Dec. 8, 2016

(30) Foreign Application Priority Data

Jun. 5, 2015 (CN) ...................... 2015 2 0386432 U

(51) Int. Cl.
*F16K 31/06* (2006.01)

(52) U.S. Cl.
CPC ...... *F16K 31/0696* (2013.01); *F16K 31/0658* (2013.01)

(58) Field of Classification Search
CPC ............. F16K 31/0658; F16K 31/0696; F16K 31/0624; F16K 31/0655
USPC ..................................... 251/129.15; 137/614
See application file for complete search history.

(56) References Cited

U.S. PATENT DOCUMENTS

| | | | | |
|---|---|---|---|---|
| 3,368,789 A | * | 2/1968 | Martin | F16K 31/0655 251/129.15 |
| 3,550,614 A | * | 12/1970 | Englund et al. | F16K 31/0655 137/245 |
| 3,791,408 A | * | 2/1974 | Saitou | F16K 17/04 137/529 |
| 4,524,797 A | * | 6/1985 | Lungu | F16K 31/082 137/343 |
| 4,826,132 A | * | 5/1989 | Moldenhauer | F16K 31/0655 137/242 |
| 5,118,072 A | * | 6/1992 | Sakamoto | F16K 31/402 251/129.17 |
| 5,715,704 A | * | 2/1998 | Cholkeri | F16K 31/0651 137/513.3 |
| 5,899,436 A | * | 5/1999 | Holmes | F16K 31/0679 251/129.1 |

(Continued)

*Primary Examiner* — Michael R Reid
*Assistant Examiner* — Jonathan Waddy
(74) *Attorney, Agent, or Firm* — Lathrop Gage LLP

(57) ABSTRACT

Provided is a solenoid valve, including a housing, comprising a valve head and a valve body defining a containing chamber; a stationary iron core, installed in the containing chamber; a moving iron core, disposed in the containing chamber and being movable between a lower proximal position and an upper distal position from the stationary iron core; a coil, fitted over an outer circumference wall of the valve body and configured to produce electromagnetic force for driving the moving iron core to move in the containing chamber; and an elastic spacer, disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core.

10 Claims, 5 Drawing Sheets

(56) References Cited

U.S. PATENT DOCUMENTS

| | | | | |
|---|---|---|---|---|
| 6,530,528 | B2* | 3/2003 | Breyer | F16K 31/406 236/92 B |
| 7,261,121 | B2* | 8/2007 | Bordonaro | F16K 27/003 137/269 |
| 7,261,122 | B2* | 8/2007 | Bordonaro | F15B 13/0817 137/269 |
| 2002/0113220 | A1* | 8/2002 | Buse | F02M 37/0023 251/129.15 |
| 2004/0069355 | A1* | 4/2004 | Sollier | F16K 31/04 137/613 |
| 2004/0232372 | A1* | 11/2004 | McCombs | F16K 31/0696 251/129.15 |
| 2007/0069166 | A1* | 3/2007 | Sisk | F16K 31/0655 251/64 |
| 2008/0017353 | A1* | 1/2008 | Folea | F01P 7/14 165/96 |
| 2010/0044608 | A1* | 2/2010 | Ogawa | F16K 31/0603 251/129.15 |
| 2010/0108927 | A1* | 5/2010 | Perz | F16K 31/0655 251/129.15 |
| 2011/0095216 | A1* | 4/2011 | deGreef | A61G 7/05776 251/129.15 |

* cited by examiner

SOLENOID VALVE AND SOLENOID VALVE DEVICE

CROSS-REFERENCE TO RELATED APPLICATION

The application claims a priority to and benefits of Chinese Patent Application No. 201520386432.0, filed with the State Intellectual Property Office of P. R. China on Jun. 5, 2015, the entire content of which is incorporated herein by reference.

FIELD

The present disclosure relates to the field of fluid control technology, and more particularly to a solenoid valve and a solenoid valve device.

BACKGROUND

In the related art, the solenoid valve has been widely used in household appliances, medical care devices and etc. For example, in a normally-opened solenoid valve, a moving iron core moves away from a stationary iron core under electromagnetic force excited by a coil; and the moving iron core is reset under gravity itself and/or elastic force when the electromagnetic force disappears by deenergizing the coil, resulting in distinct sounds caused by collision between the moving iron core and the stationary iron core. Such sounds are more distinct when a plurality of the solenoid valves is working at the same time. There is becoming more and more demand to silent environment with the household appliances, the medical care devices and etc. Therefore, working noises generated by the solenoid valve still needs to be resolved.

SUMMARY

Embodiments of the present disclosure seek to solve at least one of the problems existing in the related art. Therefore, the present disclosure provides a solenoid valve, so as to reduce noises during working.

In a first aspect, the present disclosure provides in embodiments a solenoid valve including:

a housing, including a valve head and a valve body defining a containing chamber;

a stationary iron core, installed in the containing chamber;

a moving iron core, disposed in the containing chamber and being movable between a lower proximal position and an upper distal position from the stationary iron core;

a coil, fitted over an outer circumference wall of the valve body and configured to produce electromagnetic force for driving the moving iron core to move in the containing chamber; and an elastic spacer, disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core.

According to embodiments of the present disclosure, the solenoid valve is provided with the elastic space at at least one of the stationary iron core and the moving iron core, such that the moving iron core is spaced apart from the stationary iron core at a predetermined distance L when the moving iron core is located at the lower proximal position, so as to avoid the moving iron core from colliding with the stationary iron core, and thus reducing noises generated by the solenoid valve during working.

In some embodiments of the present disclosure, the stationary iron core is provided with a first mating section; and the moving iron core is provided with a second mating section adapted to fit with the first mating section at the lower proximal position.

In some embodiments of the present disclosure, the first mating section is configured as a cavity portion at an upper end of the stationary iron core; and the second mating section is configured as an extending portion at the lower end of the moving iron core.

In some embodiments of the present disclosure, the extending portion and the cavity portion are each in a truncated-cone shape.

In some embodiments of the present disclosure, an outer circumference wall of the moving iron core is provided with a slot; and the elastic spacer is disposed in the slot.

In some embodiments of the present disclosure, the elastic spacer is fitted in the slot in an interference-fit manner.

In some embodiments of the present disclosure, an inner circumference wall of the cavity portion is provided with a first step against which the elastic spacer is abutted when the moving iron core is located at the lower proximal position.

In some embodiments of the present disclosure, the elastic spacer is made of rubber.

In some embodiments of the present disclosure, the moving iron core comprises an iron rod and a rubber pad; an upper end of the iron rod is provided with a blind hole; and the rubber pad is installed in the blind hole.

In some embodiments of the present disclosure, the blind hole and the rubber pad each have circular cross-section; a circumference wall of the blind hole is provided with a second step, so as to divide the blind hole into an upper blind hole section and a lower blind hole section; the lower blind hole section is of a diameter larger than that of the upper blind hole section; the rubber pad comprises an upper rubber pad section adapted to fit with the upper blind hole section and a lower rubber pad section adapted to fit with the lower blind hole section; and an outer circumference surface of the rubber pad transitions into a lower surface of the rubber pad with a circle arc.

In some embodiments of the present disclosure, the valve head is provided with a communicating chamber, an air inlet, a first air outlet and a by-pass hole; and the air inlet, the first air outlet and the by-pass hole are communicated to the communicating chamber.

In some embodiments of the present disclosure, the valve head is provided with at least one second air outlet communicated with the communicating chamber.

In some embodiments of the present disclosure, the valve head includes:

a connecting head, disposed at a first side of the valve head; and a connecting sheath, disposed at a second side opposite to the first side.

In a second aspect, the present disclosure provides in embodiments a solenoid valve device, including a plurality of solenoid valves. Each solenoid valve includes:

a housing, including:
a valve head, having a connecting head disposed at a first side of the valve head and a connecting sheath disposed at a second side opposite to the first side; and
a valve body, defining a containing chamber;
a stationary iron core, installed in the containing chamber;

a moving iron core, disposed in the containing chamber and being movable between a lower proximal position and an upper distal position to the stationary iron core;

a coil, fitted over an outer circumference wall of the valve body and configured to produce electromagnetic force for driving the moving iron core to move in the containing chamber; and an elastic spacer, disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core, wherein a first connecting head of a first solenoid valve is connected to a second connecting sheath of a second solenoid valve in a seamless way.

In a third aspect, the present disclosure provides in embodiments a solenoid valve device, including a plurality of solenoid valves. Each solenoid valve includes:

a housing, including:
a valve head, having a connecting head disposed at a first side of the valve head and a connecting sheath disposed at a second side opposite to the first side; and
a valve body, defining a containing chamber;
a stationary iron core, installed in the containing chamber;
a moving iron core, disposed in the containing chamber and being movable between a lower proximal position and an upper distal position to the stationary iron core;
a coil, fitted over an outer circumference wall of the valve body and configured to produce electromagnetic force for driving the moving iron core to move in the containing chamber; and
an elastic spacer, disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core, wherein a first connecting sheath of a first solenoid valve is connected to a second connecting head of a second solenoid valve in a seamless way.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
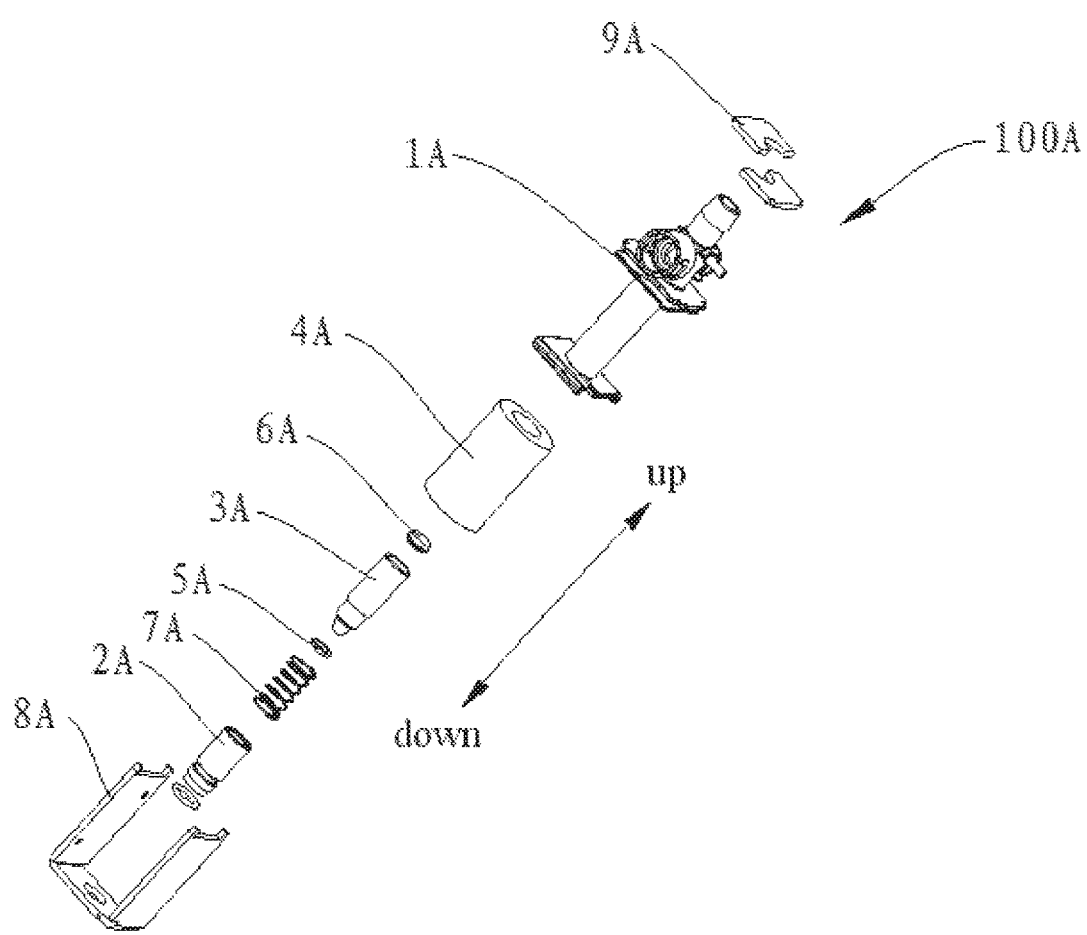
FIG. 1 is an exploded view of a solenoid valve according to an embodiment of the present disclosure.

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

Various embodiments and examples are provided in the following description to implement different structures of the present disclosure. In order to simplify the present disclosure, certain elements and settings will be described. However, these elements and settings are only by way of examples and are not intended to limit the present disclosure. In addition, reference numerals may be repeated in different examples in the present disclosure.

This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

According to a first embodiment of the present disclosure, the solenoid valve 100A is described with reference to FIGS. 1 to 6 below.

Figure 2:
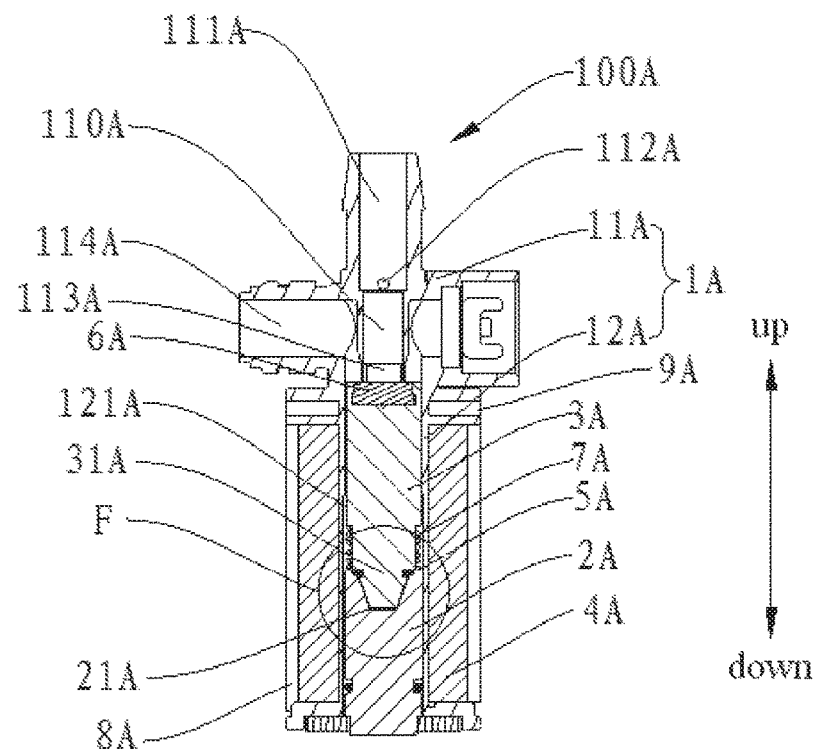
FIG. 2 is a sectional view of a solenoid valve when the a by-pass hole is in an opening state, according to an embodiment of the present disclosure.
Figure 3:
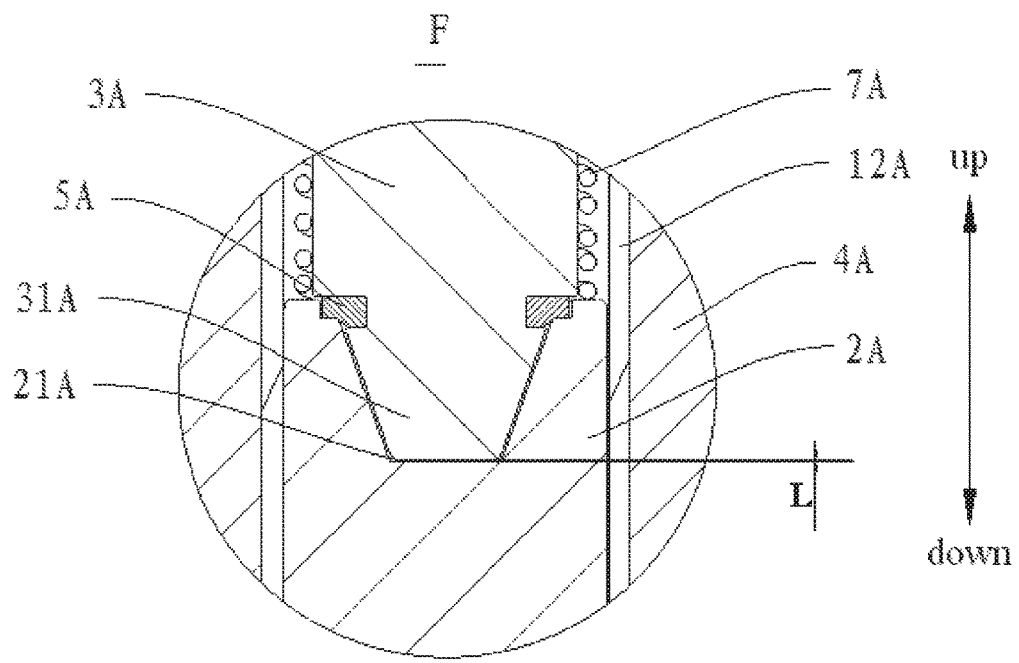
FIG. 3 is an enlarged view at the region F of the solenoid valve in FIG. 2.

According to embodiments of the present disclosure, the solenoid valve 100A may be used in household appliances, medical care devices, but not limited thereto. As shown in FIGS. 1 and 2, the solenoid valve 100A according to embodiments of the present disclosure may include a housing 1A, a stationary iron core 2A, a moving iron core 3A, a coil 4A and an elastic spacer 5A.

In specific, as shown in FIG. 2, the housing 1A may include a valve head 11A and a valve body 12A. The valve body 12A defines a containing chamber 121A. The stationary iron core 2A is installed in the containing chamber 121A. The moving iron core 3A is disposed in the containing chamber 121A and is movable between a lower proximal position and an upper distal position from the stationary iron core. The coil 4A is fitted over an outer circumference wall of the valve body 12A and configured to produce electromagnetic force for driving the moving iron core 3A to move in the containing chamber 121A. The elastic spacer 5A is disposed at at least one of the stationary iron core 2A and the moving iron core 3A; and is configured to enable the moving iron core 3A to be spaced apart from the stationary iron core 2A at a predetermined distance L when the moving iron core 3A is located at the lower proximal position, so as to avoid the moving iron 3A core from colliding with the stationary iron core 2A.

For example, according to an embodiment of the present disclosure, for a normally-opened solenoid valve 100A, when the solenoid valve 100A is in an ON state, the electromagnetic force generated by the coil 4A is repulsive force, under which the moving iron core 3A moves away from the stationary iron core 2A, resulting in an increasing distance between the moving iron core 3A and the stationary iron core 2A; in other words, the moving iron core 3A moves from the lower proximal position towards the upper distal position. When the solenoid valve 100A is in an OFF state, the electromagnetic force generated by the coil 4A disappears, the moving iron core 3A moves towards the stationary iron core 2A (i.e., a reset movement) under gravity itself and/or external force (such elastic force by a spring 7A), resulting in a decreasing distance between the moving iron core 3A and the stationary iron core 2A; in other words, the moving iron core 3A moves from the upper distal position towards the lower proximal position. The moving iron core 3A moves at a slowing speed when the spacer 5A at the moving iron core 3A is in contact with the stationary iron core 2A. When the moving iron core 3A stops moving, the moving iron core 3A is located at the lower proximal position, such that the moving iron core 3A is spaced apart from the stationary iron core 2A at the predetermined distance L, so as to avoid the moving iron 3A core from colliding with the stationary iron core 2A.

It would be appreciated that direct collision between the moving iron core 3A and the stationary iron core 2A generates distinct impact sounds, as cores 3A and 2A are made of metal material. In particular, the impact sounds are even more annoying when superimposing with a plurality of the solenoid valve 100A. However, according to embodiments of the present disclosure, the solenoid valve 100A is provided with the elastic space 5A at at least one of the stationary iron core 2A and the moving iron core 3A, such that the moving iron core 3A is spaced apart from the stationary iron core 2A at a predetermined distance L when the moving iron core is located at the lower proximal position, so as to avoid the moving iron core 3A from colliding with the stationary iron core 2A, and thus reducing noises generated by the solenoid valve during working.

It should be noted that the moving iron core 3A is of an opposite moving route when the solenoid valve 100A is a normally-closed type as compare to that of the normally-opened type. For the normally-closed type, it would be appreciated by those skilled in the art that the moving iron core 3A moves towards the stationary iron core 2A when the coil 4A is in the ON state; and the moving iron core 3A is spaced apart from the stationary iron core 2A under external force when the coil 4A is in the OFF state; in other word, the moving iron core 3A moves from the lower proximal position towards the upper distal position, which is not described in detail herein.

In addition, referring to FIGS. 1 and 2, the solenoid valve 100A may be generally provided with a U-shaped iron frame 8A and a fixing iron plate 9A, so as to increase intensity of the electromagnetic field. The stationary iron core 2A may extend outside the containing chamber 121A with one end (that is away from the moving iron core 3A, e.g., the lower end of the stationary iron core as as shown in FIG. 2), which is fixed to the U-shaped iron frame 8A by riveting. Alternatively, the valve body 12 and the U-shaped iron frame 8A may be locked together by screws, and the valve head 11A may be locked with the U-shaped iron frame 8A by the fixing iron plate 9A, such that the U-shaped iron frame 8A and the fixing iron plate 9A may form a completed electromagnetic circuit to increase the intensity of the electromagnetic field when the solenoid valve 100A is in the ON state, so that the solenoid valve 100A may be started with a lower voltage.

According to embodiments of the present disclosure, the solenoid valve 100A is provided with the elastic space 5A at at least one of the stationary iron core 2A and the moving iron core 3A, such that the moving iron core 3A is spaced apart from the stationary iron core 2A at a predetermined distance L when the moving iron core is located at the lower proximal position, so as to avoid the moving iron core from colliding with the stationary iron core, and thus reducing noises generated by the solenoid valve during working.

In an embodiment of the present disclosure, the stationary iron core 2A is provided with a first mating section; and the moving iron core 3A is provided with a second mating section adapted to fit with the first mating section at the lower proximal position. In other words, the stationary iron core 2A is provided with the first mating section, the moving iron core 3A is provided with the second mating section, and the first mating section is fitted with the second mating section when the moving iron core 3A is located at the lower proximal position.

Figure 4:
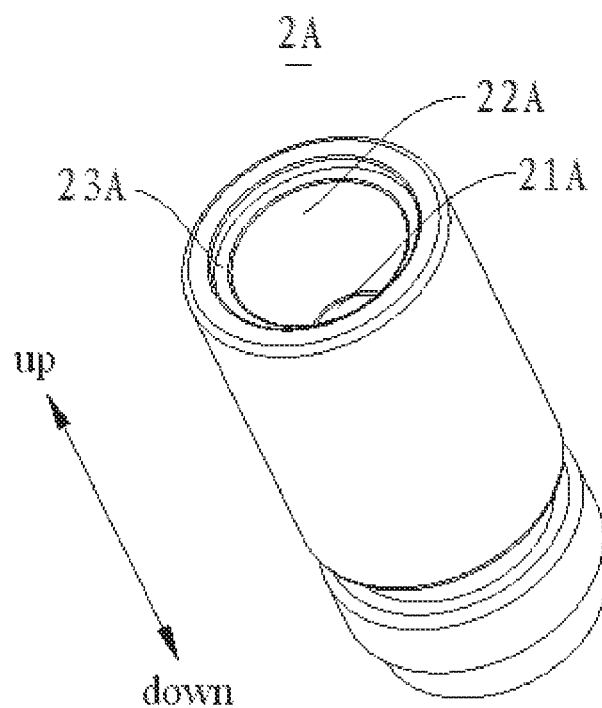
FIG. 4 is a stereogram of a stationary iron core according to an embodiment of the present disclosure.
Figure 5:
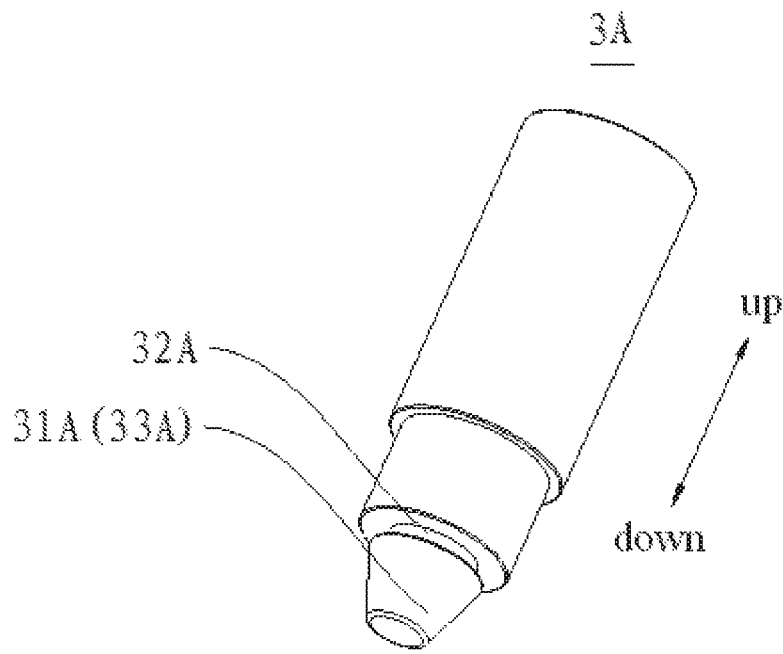
FIG. 5 is a stereogram of a moving iron core according to an embodiment of the present disclosure.
Figure 6:
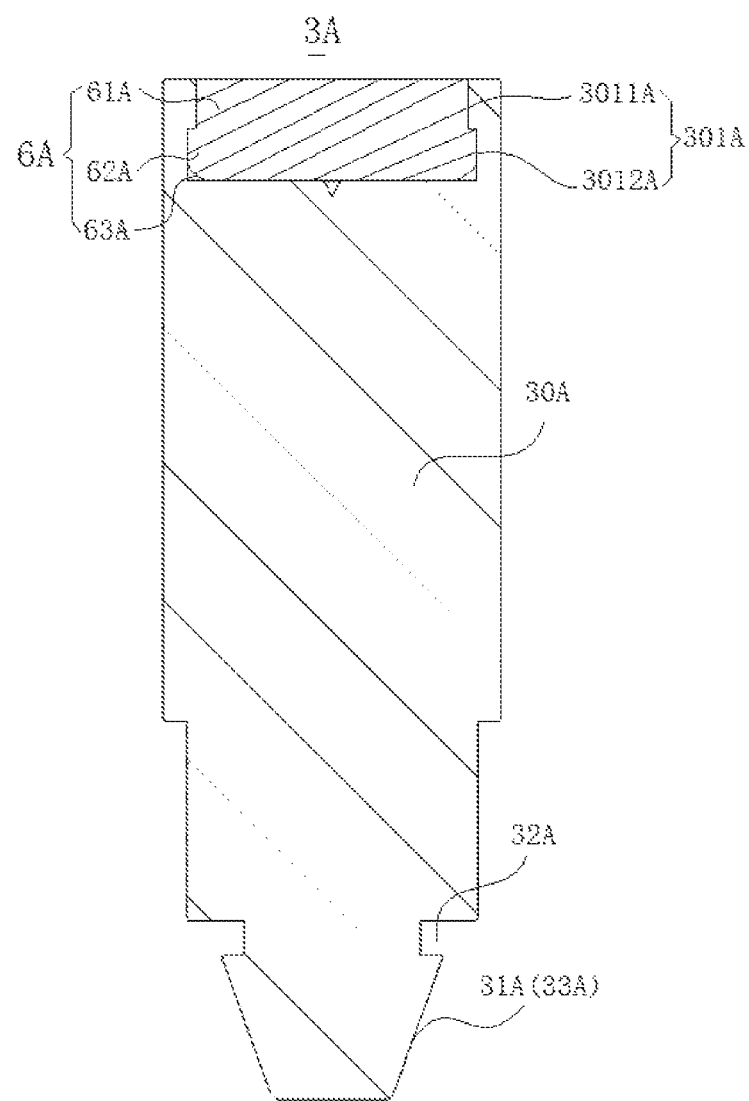
FIG. 6 is a sectional view of a moving iron core according to an embodiment of the present disclosure.

As shown in FIGS. 4 to 6, the first mating section is configured as a cavity portion 21A at an upper end of the stationary iron core; and the second mating section is configured as an extending portion 31A at the lower end of the moving iron core. The extending portion 31A stretches into the cavity portion 21A gradually as the moving iron core 3A moves towards the stationary iron core 2A, such that the extending portion 31A is fitted to the cavity portion 21A with an enlarged contacting area as compared with a traditional solenoid valve, thus increasing a magnetic flux area when the stationary iron core 2A and the moving iron core 3A are in the ON state, providing the moving iron core 3A more powerful electromagnetic force, so that the solenoid valve 100A may be started with a lower voltage.

Alternatively, the extending portion 3A is of a longitudinal section similar to that of the cavity portion 2A, such as a triangle and an antiparallelogram, so as to further increase the magnetic flux area between the stationary iron core 2A and the moving iron core 3A. Preferably, the extending portion 31A and the cavity portion 21A may be each configured as a truncated-cone shape 22A(33A), so as to improve stability of the moving iron core 3A during the movement, and further increase the magnetic flux area between the stationary iron core 2A and the moving iron core 3A.

In an embodiment of the present disclosure, referring to FIGS. 3 to 6, an outer circumference wall of the moving iron core is provided with a slot 32A; and the elastic spacer 5A is disposed in the slot 32A, so as to prevent the elastic spacer 5A from moving relative to the moving iron core 3A. Preferably, the elastic spacer 5A is fitted in the slot 32A in an interference-fit manner, so as to further prevent the elastic spacer 5A from moving relative to the moving iron core 3A in a reliable way.

Preferably, the elastic spacer 5A is made of rubber, so that the elastic spacer 5A may generate certain deformations as being in contact with the stationary iron core 2A, thereby decreasing force intensity when the moving iron core 3A is collided with the stationary iron core 2A, and thus further reducing the impact noises between the moving iron core 3A and the stationary iron core 2A.

Alternatively, referring to FIG. 4, an inner circumference wall of the cavity portion 21A is provided with a first step 23A against which the elastic spacer 5A is abutted when the moving iron core is located at the lower proximal position, such that the elastic spacer 5A may be compressed and the moving iron core 3A may move downwards further, so that the moving iron core 3A may be close to the stationary iron core 2A as much as possible, so as to reduce a magnetic air gap between the moving iron core 3A and the stationary iron core 2A, thus reducing loss of the electromagnetic force.

Alternatively, referring to FIG. 6, the moving iron core 3A includes an iron rod 30A and a rubber pad 6A. An upper end of the iron rod 30A is provided with a blind hole 301A, and the rubber pad 6A is installed in the blind hole 301A.

The blind hole 301A and the rubber pad 6A have circular cross-section; a circumference wall of the blind hole 301A is provided with a second step, so as to divide the blind hole 301A into an upper blind hole section 3011A and a lower blind hole section 3012A; the lower blind hole section 3012A is of a diameter larger than that of the upper blind hole section 3011A; the rubber pad 6A includes an upper rubber pad section 61A adapted to fit with the upper blind hole section 3011A and a lower rubber pad section 62A adapted to fit with the lower blind hole section 3012A; and an outer circumference surface of the rubber pad 6A transitions into a lower surface of the rubber pad 6A with a circle arc 63A. The rubber pad 6A may be compressed and released alternately in use, resulting in repeated deformations. However, the lower rubber pad section 62A of the rubber pad 6A is clamped in the lower blind hole section 3012A of the blind hole 301A, so as to prevent the rubber pad 6A from separating out of the blind hole 301.

Furthermore, the outer circumference surface of the rubber pad 6A transitions into the lower surface of the rubber pad 6A with the circle arc 63A, so as to facilitate the lower rubber pad section 62A with the larger diameter to be inserted into the upper blind hole section 3011A with the smaller diameter by means of the arc 63A, and to be clamped in the lower blind hole section 3012A adapted to the lower rubber pad section 62A after the compressed deformations when passing through the upper blind hole section 3011A is recovered as entering the lower blind hole section 3012A. The rubber pad 6A is compressed and released alternately in use, resulting in repeated deformations along an axis direction in such a manner that the lower rubber pad section 62A of the rubber pad 6A is prevented from generating sufficient deformation which leads to separation from the upper blind hole section 3011A, so that the rubber pad 6A may be clamped in the lower blind hole section 3012A in a firm way, thereby preventing the rubber pad 6A from separating out of the blind hole 301A.

As a result, the above moving iron core 3A is merely improved with structures of the blind 301A at the iron rod 30A and the rubber pad 6A, without increasing manufacturing procedures and difficulties of the iron rod 30A and the rubber pad 6A, so as to prevent the rubber pad 6A from separating out of the blind hole 301A and avoid from utilizing additional steps (eg. glue) during installation, thereby having advantages such as good using effects, maintenance-free and being easy to be processed and installed, and thus bringing producers and users higher economic benefits (easy to be implemented and promoted) as compared with the three-pass moving iron core in the related art.

Referring to FIG. 2, the valve head 11A of the solenoid valve 100A is provided with a communicating chamber 110A, an air inlet 111A, a first air outlet 112A and a by-pass hole 113A. The air inlet 111A, the first air outlet 112A and the by-pass hole 113A are communicated to the communicating chamber 110A. The by-pass hole 113A is opened and closed with the movement of the rubber pad 6A in the iron rod 30A. The valve head 11A is provided with at least one second air outlet 114A communicated with the communicating chamber 110A, such that different gas paths are connected in accordance with the open-and-close state of the by-pass hole 113A controlled by the rubber pad 6A.

Accordingly, referring to FIG. 2, for a normally-opened solenoid valve, when the solenoid valve 100A is in the ON state, the coil 4A excites an electromagnetic field under which the moving iron core 3A moves away from the stationary iron core 2A until the by-pass hole 113A is closed by the rubber pad 6A; at this time, the moving iron core 3A is located at the upper distal position, and the air inlet 111A is communicated with the first air outlet 112A, other than by-pass hole 113A; when the solenoid valve 100A is in the OFF state, the moving iron core 3A moves towards the stationary iron core 2A under elastic force by a spring 7A and/or gravity itself until the elastic spacer 5A is compressed completely, where the moving iron core is located at the lower proximal location as being closest to the stationary iron core 2A.

Figure 7:
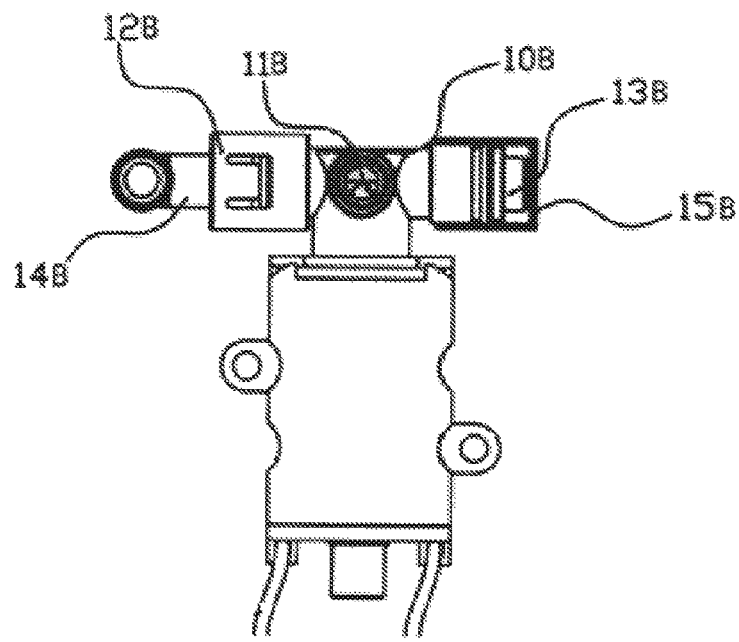
FIG. 7 is a schematic view of a single solenoid valve according to an embodiment of the present disclosure.

Referring to FIG. 7, the valve head 11A includes a connecting head 13B disposed at a first side (eg., a right side in FIG. 7); and a connecting sheath 12B disposed at a second side (eg., a left side in FIG. 7) opposite to the first side; in other words, the connecting head 13B and connecting sheath 12B are disposed at two opposite sides, respectively. The connecting sheath 12B is provided with a nozzle 14B which may be connected to an air source; and the connecting head 13B is closed with a plug 15B. During working, an electromagnetic device 2B controls an air outlet tube 11B to be connected to a connecting tube 10B or not, so as to control air pressure. Therefore, the plurality of solenoid valves may be connected in a seamless way, so as to facilitate the plurality of solenoid valves to be used in series and dismounted.

Figure 8:
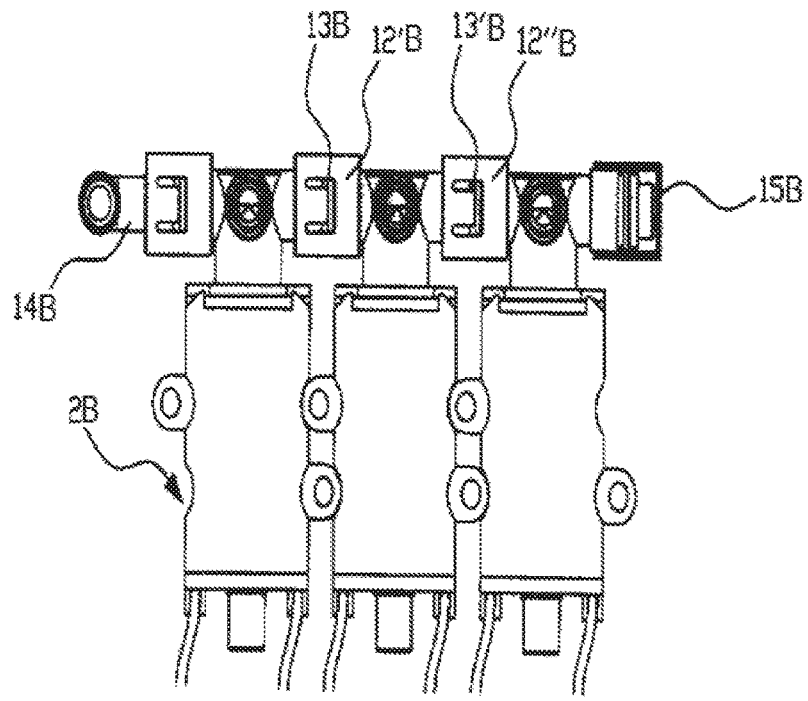
FIG. 8 is a schematic view of three solenoid valves arranged in series according to an embodiment of the present disclosure.

Besides, referring to FIG. 8, in the case that three solenoid valves are used in series, a first connecting head 13B of a first solenoid valve is connected to a second connecting sheath 12'B of a second solenoid valve in a seamless way, and a second connecting head 13'B of the second solenoid valve is connected to a third connecting sheath 12"B of a third solenoid valve in a seamless way, such that the plurality of solenoid valve is connected in series.

A solenoid valve device according to a first embodiment of the present disclosure is described below.

The solenoid valve device includes a plurality of solenoid valves, each of which includes: a housing, a stationary iron core, a moving iron core, a coil and an elastic spacer. The housing includes a valve head and a valve body. The valve head has a connecting head disposed at a first side of the valve head and a connecting sheath disposed at a second side opposite to the first side. The valve body defines a containing chamber. The stationary iron core is installed in the containing chamber. The moving iron core is disposed in the containing chamber and is movable between a lower proximal position and an upper distal position to the stationary iron core. The coil is fitted over an outer circumference wall of the valve body and is configured to produce electromagnetic force for driving the moving iron core to move in the containing chamber. The elastic spacer is disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core. A first connecting head of a first solenoid valve is connected to a second connecting sheath of a second solenoid valve in a seamless way. It should note that each solenoid valve in the present embodiment is of a substantially identical structure to the solenoid valve 100A described above, which is not repeated herein.

A solenoid valve device according to a second embodiment of the present disclosure is described below.

The solenoid valve device includes a plurality of solenoid valves, each of which includes: a housing, a stationary iron core, a moving iron core, a coil and an elastic spacer. The housing includes a valve head and a valve body. The valve head has a connecting head disposed at a first side of the valve head and a connecting sheath disposed at a second side opposite to the first side. The valve body defines a containing chamber. The stationary iron core is installed in the containing chamber. The moving iron core is disposed in the containing chamber and is movable between a lower proximal position and an upper distal position to the stationary iron core. The coil is fitted over an outer circumference wall of the valve body and is configured to produce electromagnetic force for driving the moving iron core to move in the containing chamber. The elastic spacer is disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core. A first connecting sheath of a first solenoid valve is connected to a second connecting head of a second solenoid valve in a seamless way. It should note that each solenoid valve in the present embodiment is of a substantially identical structure to the solenoid valve 100A described above, which is not repeated herein.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature explicitly or implicitly. In the description of the present invention, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A solenoid valve, comprising:
   a housing, comprising a valve head and a valve body defining a containing chamber, wherein the valve head is provided with a communicating chamber, an air inlet, a first air outlet, a by-pass hole, and at least one second air outlet; and the air inlet, the first air outlet, the by-pass hole, and the at least one second air outlet are communicated with the communicating chamber, the communicating chamber and the air inlet are coaxial, an axis of the air inlet is perpendicular to an axis of the first air outlet and an axis of the at least one second air outlet, the axis of the first air outlet is orthogonal to the axis of the at least one second air outlet, and an axis of the by-pass hole is coaxial with an axis of the communicating chamber;
   a stationary iron core, installed in the containing chamber;
   a moving iron core, disposed in the containing chamber and being movable between a lower proximal position and an upper distal position from the stationary iron core, and having a rubber pad arranged at an upper end of the moving iron core;
   a coil, fitted over an outer circumference wall of the valve body and configured to produce electromagnetic force for driving the moving iron core to move in the containing chamber; and
   an elastic spacer, disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core,
   wherein the stationary iron core is provided with a first mating section, and the moving iron core is provided with a second mating section adapted to fit with the first mating section at the lower proximal position, and the by-pass hole is directly opened and closed by an end face, perpendicular to an axis of the moving iron core, of the rubber pad along with the movement of the rubber pad, wherein the upper end of the moving iron core is provided with a blind hole and the rubber pad is installed in the blind hole.

2. The solenoid valve according to claim 1, wherein the first mating section is configured as a cavity portion at an upper end of the stationary iron core; and the second mating section is configured as an extending portion at the lower end of the moving iron core.

3. The solenoid valve according to claim 2, wherein the extending portion and the cavity portion are each in a truncated-cone shape.

4. The solenoid valve according to claim 2, wherein an inner circumference wall of the cavity portion is provided with a first step against which the elastic spacer is abutted when the moving iron core is located at the lower proximal position.

5. The solenoid valve according to claim 1, wherein an outer circumference wall of the moving iron core is provided with a slot; and the elastic spacer is disposed in the slot.

6. The solenoid valve according to claim 5, wherein the elastic spacer is fitted in the slot in an interference-fit manner.

7. The solenoid valve according to claim 1, wherein the elastic spacer is made of rubber.

8. The solenoid valve according to claim 1, wherein the blind hole and the rubber pad each have a circular cross-section;

a circumference wall of the blind hole is provided with a second step, so as to divide the blind hole into an upper blind hole section and a lower blind hole section;

the lower blind hole section is of a diameter larger than that of the upper blind hole section;

the rubber pad comprises an upper rubber pad section adapted to fit with the upper blind hole section and a lower rubber pad section adapted to fit with the lower blind hole section; and an outer circumference surface of the rubber pad transitions into a lower surface of the rubber pad with a circle arc.

9. The solenoid valve according to claim 1, wherein the valve head comprises:

a connecting head, disposed at a first side of the valve head; and a connecting sheath, disposed at a second side opposite to the first side.

10. A solenoid valve device, comprising a plurality of solenoid valves, each comprising:

a housing, comprising:

a valve head, having a connecting head disposed at a first side of the valve head and a connecting sheath disposed at a second side opposite to the first side, wherein the valve head is provided with a communicating chamber, an air inlet, a first air outlet, a by-pass hole, and at least one second air outlet; and the air inlet, the first air outlet, the by-pass hole, and the at least one second air outlet are communicated with the communicating chamber, the communicating chamber and the air inlet are coaxial, an axis of the air inlet is perpendicular to an axis of the first air outlet and an axis of the at least one second air outlet, the axis of the first air outlet is orthogonal to the axis of the at least one second air outlet, and an axis of the by-pass hole is coaxial with an axis of the communicating chamber; and a valve body, defining a containing chamber;

a stationary iron core, installed in the containing chamber;

a moving iron core, disposed in the containing chamber and being movable between a lower proximal position and an upper distal position to the stationary iron core, and having a rubber pad arranged at an upper end of the moving iron core;

a coil, fitted over an outer circumference wall of the valve body and configured to produce electromagnetic force for driving the moving iron core to move in the containing chamber; and an elastic spacer, disposed at at least one of the stationary iron core and the moving iron core and configured to enable the moving iron core to be spaced apart from the stationary iron core at a predetermined distance L when the moving iron core is located at the lower proximal position, so as to avoid the moving iron core from colliding with the stationary iron core, wherein the stationary iron core is provided with a first mating section; and the moving iron core is provided with a second mating section adapted to fit with the first mating section at the lower proximal position, and the by-pass hole is directly opened and closed by an end face, perpendicular to an axis of the moving iron core, of the rubber pad along with the movement of the rubber pad, wherein a first connecting head of a first solenoid valve is connected to a second connecting sheath of a second solenoid valve in a seamless way.

* * * * *